United States Patent [19]

Igarashi et al.

[11] Patent Number: 4,901,316

[45] Date of Patent: Feb. 13, 1990

[54] DISASTER PREVENTION MONITORING AND CONTROL FACILITY

[75] Inventors: Akira Igarashi; Takashi Kobayashi, both of Tokyo, Japan

[73] Assignee: Nohmi Bosai Kogyo Co., Ltd., Tokyo, Japan

[21] Appl. No.: 50,476

[22] Filed: May 18, 1987

[30] Foreign Application Priority Data

May 27, 1986 [JP] Japan ................................ 61-121922
May 27, 1986 [JP] Japan ................................ 61-121923
May 27, 1986 [JP] Japan ................................ 61-121924

[51] Int. Cl.⁴ ................................................ G06F 11/10

[52] U.S. Cl. .................................. 371/37.1; 371/20.1; 340/825.08; 364/200

[58] Field of Search ................. 371/37, 22, 20.1, 20.6, 371/37.1, 20.2, 53, 54; 340/825.08, 825.07, 825.06, 825.16, 825.17; 364/200 MS File

[56] References Cited

U.S. PATENT DOCUMENTS

| | | | |
|---|---|---|---|
| 4,162,483 | 7/1979 | Entenman | 371/37 X |
| 4,410,985 | 10/1983 | Yasumoto | 340/825.08 X |
| 4,683,531 | 7/1987 | Kelch | 340/825.08 X |
| 4,712,215 | 12/1987 | Joshi | 371/37 |
| 4,718,005 | 1/1988 | Feigenbaum | 364/200 |
| 4,727,359 | 2/1988 | Yuchi | 340/825.08 X |
| 4,740,787 | 4/1988 | Kimura | 340/825.08 |

*Primary Examiner*—Jerry Smith
*Assistant Examiner*—Robert W. Beausoliel
*Attorney, Agent, or Firm*—Wenderoth, Lind & Ponack

[57] ABSTRACT

A disaster prevention monitoring and control facility for polling a plurality of terminal units from a receiver to read terminal information from the plurality of terminal units, judging the terminal information as required, displaying the judged result, or controlling the plurality of terminal units, which frame checks data transmitted from the receiver to the terminal units or data transmitted from the terminal units to the receiver.

11 Claims, 9 Drawing Sheets

FIG. 4 (1)
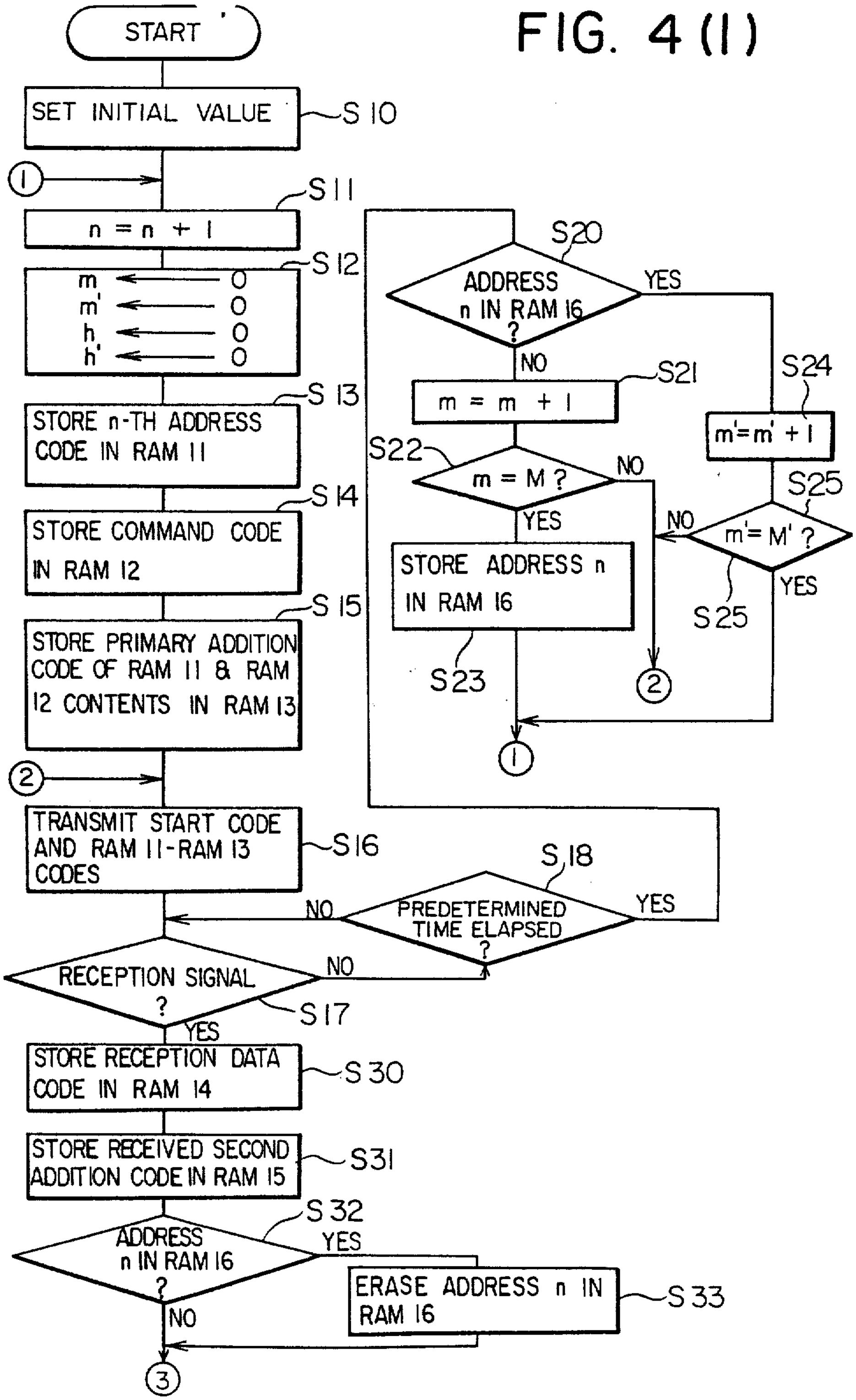

FIG. 4 (2)
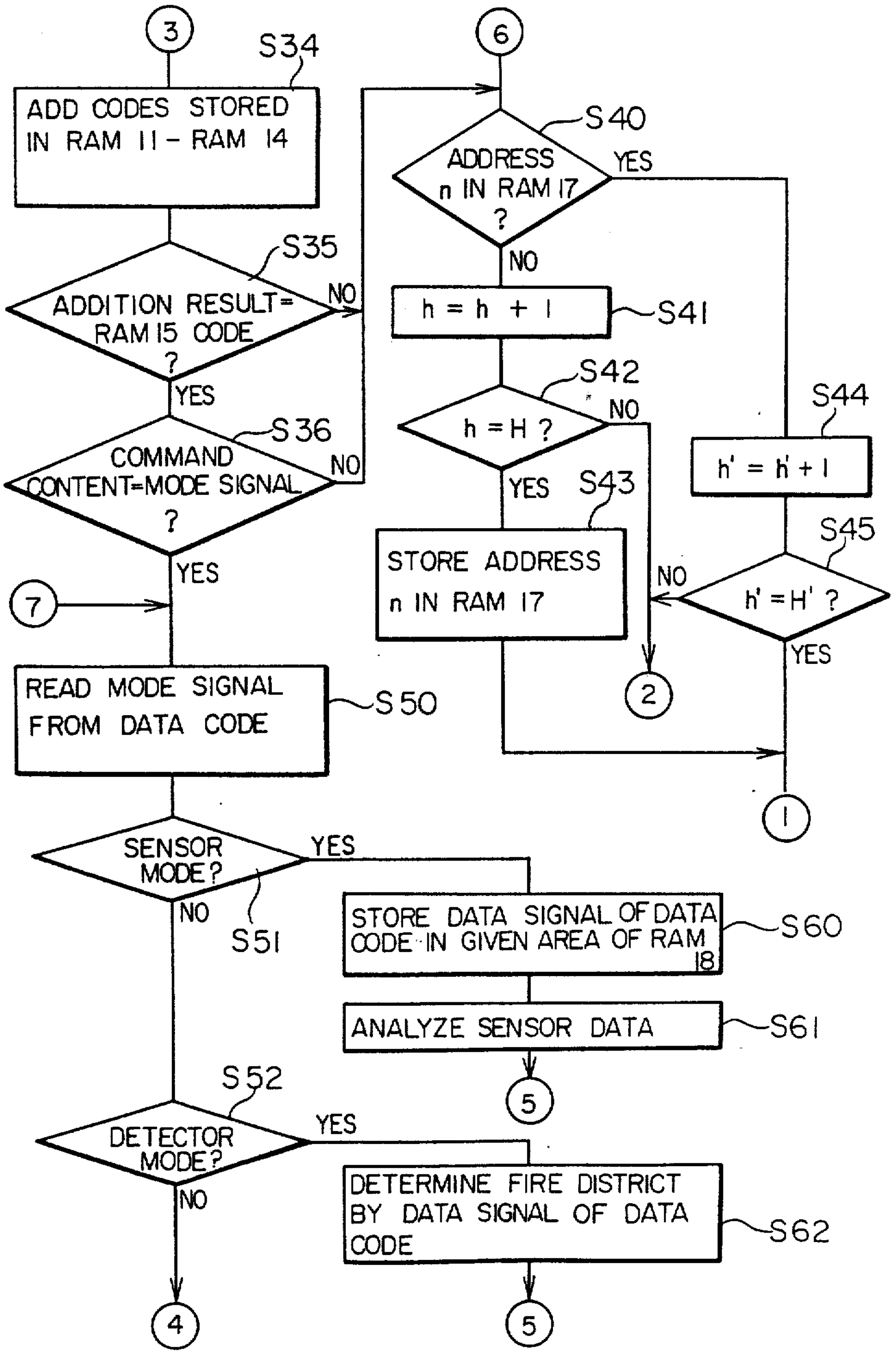

FIG. 4 (3)
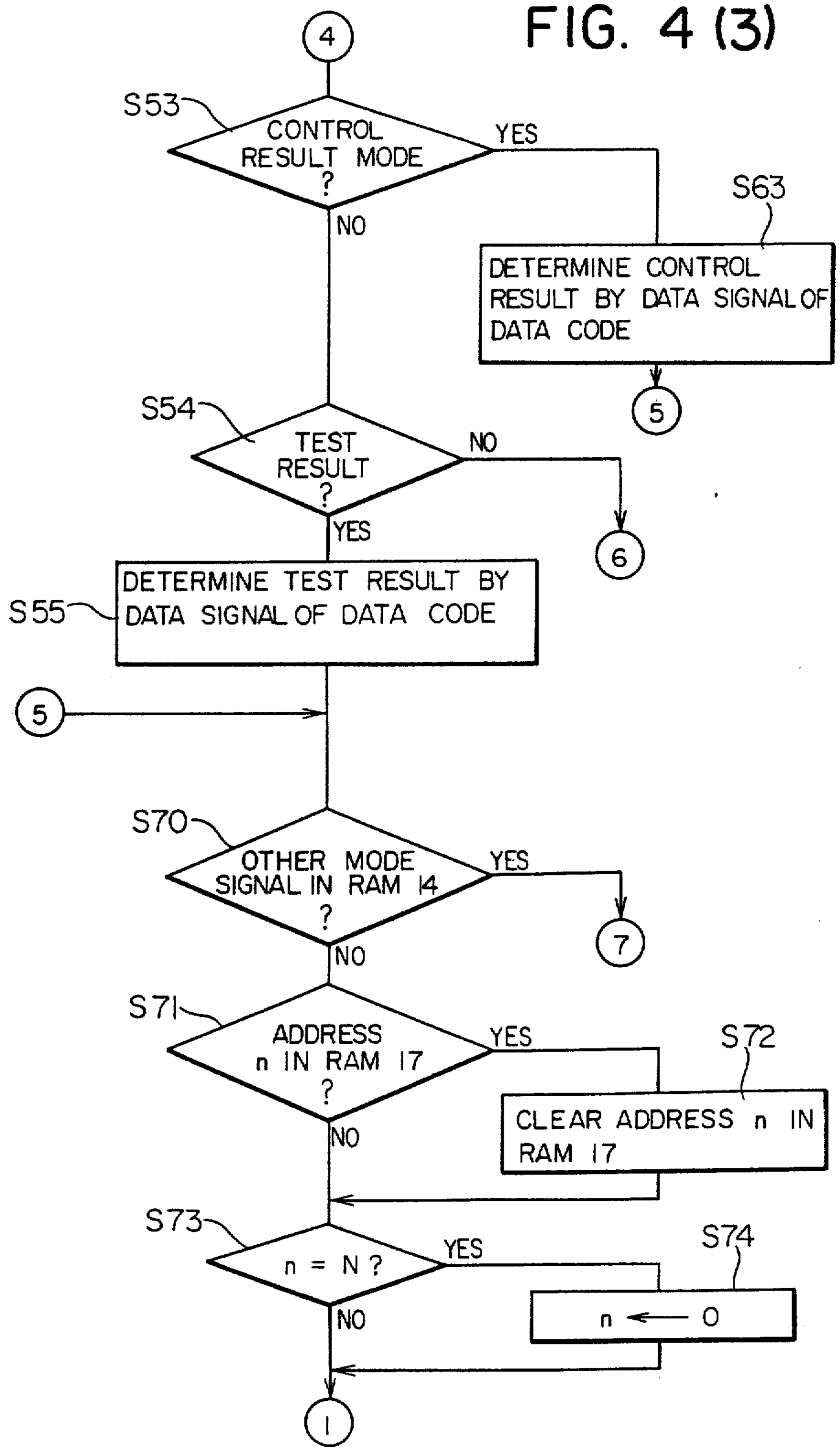

FIG. 7

| MODE \ SIGNAL | DATA CODE | | |
|---|---|---|---|
| | MODE SIGNAL | | DATA SIGNAL |
| DETECTOR MODE | 0 | 0 | D0 D1 D2 D3 D4 D5 |
| CONTROL RESULT MODE | 0 | 1 | D0 D1 D2 D3 D4 D5 |
| TEST RESULT MODE | 1 | 0 | D0 D1 D2 D3 D4 D5 |
| SENSOR MODE | 1 | 1 | D0 D1 D2 D3 D4 D5 |

DISASTER PREVENTION MONITORING AND CONTROL FACILITY

BACKGROUND OF THE INVENTION

This invention relates to a disaster prevention monitoring and control facility.

A disaster prevention monitoring and control facility is known in the art in which a receiver polls terminal units such as fire sensors, fire detectors, smoke eliminators, fire extinguishers, antitheft detectors or repeaters connected with those units to allow the called terminal unit to transmit monitoring information to the receiver, and the receiver to collect the monitoring information. This facility transmits control information to the terminal unit called by the receiver.

If a transmission error occurs between a receiver and a terminal unit in the disaster prevention monitoring and control facility of this type, there is a possibility, for example, that an area where there is no fire is erroneously judged, as an area where a fire has broken out or a terminal unit may erroneously evaluate a control command to operate a smoke eliminator or a fire extinguisher.

Thus, the prior-art disaster prevention monitoring and control facility described above performs a parity check to prevent transmission errors in a signal from the receiver to the terminal unit or from the terminal unit to the receiver from transmission errors.

However, even though a parity check can detect a one bit error, it cannot detect a plurality of bit errors.

For preventing the erroneous bit evaluation the continuous transmission of the same signals twice from the receiver and the terminal unit and the receiving terminal unit or the receive to determine whether or not the two received signals coincide or not has been considered. In this case, there is a drawback in that the frame length of the transmitted signal is increased between the receiver and the terminal unit to increase the time needed to poll all the terminal units, thereby taking a longer time to detect a fire or intrusion which demand short processing times.

Further, the terminal units of prior-art polling type facilities only return data to the receiver. Thus, there is another drawback in that the receiver cannot accurately know the type of data transmitted from the terminal unit.

If the terminal unit, for instance, erroneously returns the data of a tested result when the receiver, for example, instructs the terminal unit to return the data detected by a certain sensor, the receiver identifies the returned data as the data detected by the sensor. Thus, in this case, the receiver erroneously judges the data.

Moreover, if a polled terminal unit does not reply in the prior-art disaster prevention monitoring and control facility, the terminal unit is continuously called a predetermined number of times (e.g., five times), and the next terminal unit is thereafter polled. When the final terminal unit is thus polled, a first polling cycle is finished. If the terminal unit which did not reply in the first cycle does not again respond in the second cycle, it is repeatedly polled a predetermined number of times (five times in this example) until a response is obtained.

If a terminal unit which has transmitted an error signal is polled, a process is executed which is similar to the case of no response from the terminal unit. In other words, when the terminal unit which has transmitted an error signal is polled, the terminal unit is continuously called a predetermined number of times, the next terminal unit is thereafter polled, and if the terminal unit which has returned an error signal in the first polling cycle also returns an error signal in the second cycle, then the polling steps are repeated a predetermined number of times until a normal signal is returned.

However, in the abovementioned disaster prevention monitoring and control facility, there arises a drawback in that the polling steps stagnate in the terminal unit which has not responded or has transmitted an erroneous signal to delay the acquisition of monitoring information or the transmitting speed of control information. When there are a plurality of abnormal terminal units which have not replied or have transmitted erroneous signals and the acquisition of monitoring information or the transmission of control information is required for an emergency such as a fire or a theft, a delay in the acquisition speed or the transmission speed becomes a serious problem.

SUMMARY OF THE INVENTION

This invention has been made in order to eliminate such drawbacks, and for its object to provide a disaster prevention monitoring and control facility which can accurately check the erroneous transmission of a signal occurring between a receiver and a terminal unit.

Another object of this invention is to provide a disaster prevention monitoring and control facility which polls a plurality of terminal units from a receiver to read, judge and display terminal information from the terminal units or to control the terminal units, in which the receiver can accurately judge the type of data returned from the terminal units to the receiver.

Still another object of this invention is to provide a disaster prevention monitoring and control facility which polls a plurality of terminal units from a receiver, a terminal unit being continuously called a predetermined number of times if the terminal unit is abnormal such as when there is no response and then polling the next terminal to read, judge and display terminal information from the terminal units or to control the terminal units, in which the acquisition of monitoring information or the transmitting speed of control information is not delayed if the terminal unit is abnormal.

BRIEF DESCRIPTION OF THE DRAWINGS

FIGS. 4(1), 4(2) and 4(3) are flow charts showing the operation of a receiver in the above embodiment;

FIG. 7 is a view showing an example of a received data code returned from the terminal unit in the above-described embodiment.

DESCRIPTION OF THE PREFERRED EMBODIMENT

Figure 1:
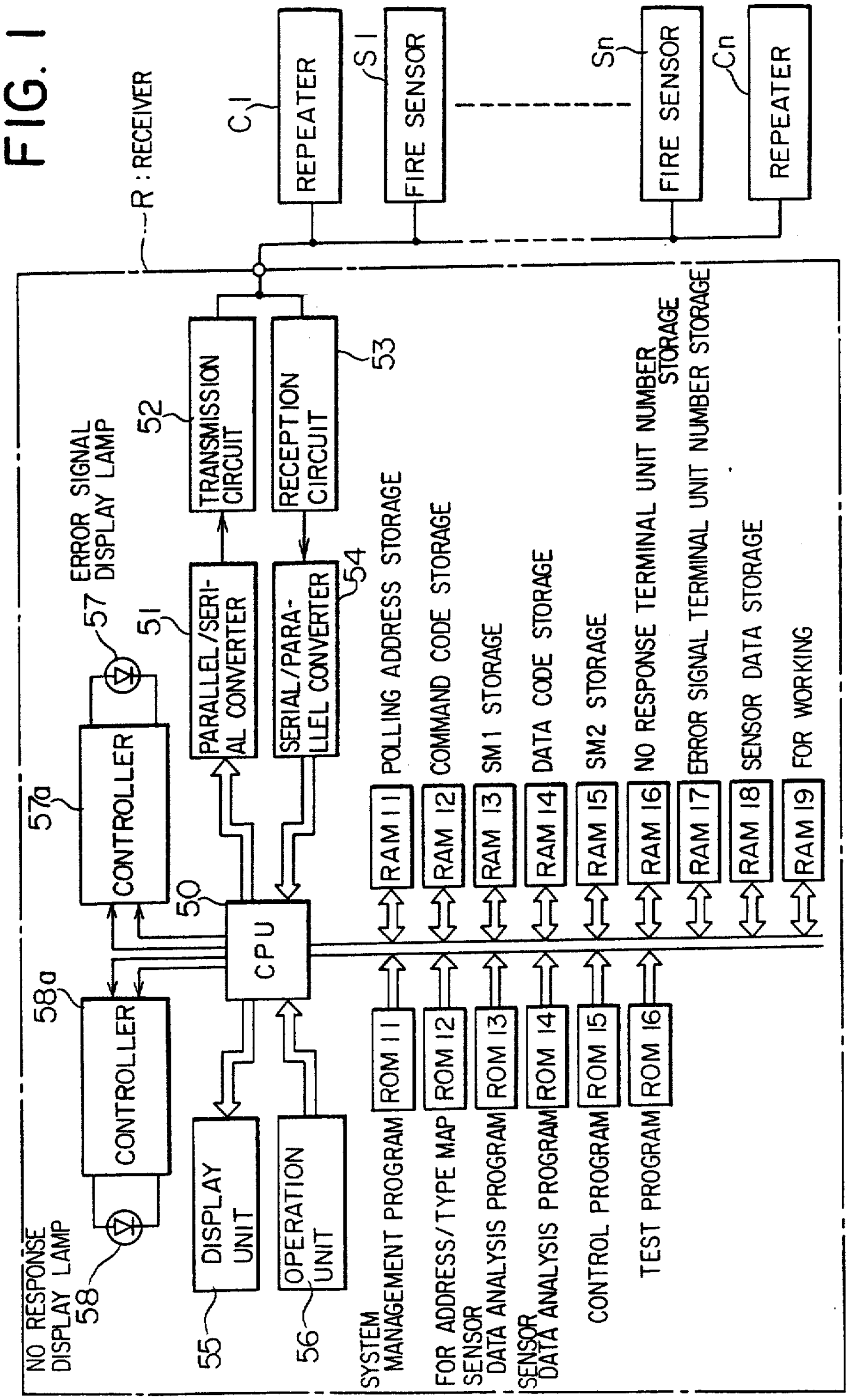
FIG. 1 is a block diagram showing an example of a receiver in an embodiment of a disaster prevention monitoring and control facility according to the present invention.

FIG. 1 is a block diagram showing an example of a receiver in an embodiment of a disaster prevention monitoring and control facility according to the present invention.

A receiver R comprises a CPU 50 for controlling the entirety of the receiver R, a parallel/serial conversion circuit 51 for converting parallel signals from the CPU 50 to serial signals, a transmission circuit 52 for transmitting a transmission signal (serial signals) to a terminal unit, a reception circuit 53 for receiving the signal from the terminal unit, a serial/parallel conversion circuit 54 for converting the reception signal (serial signals) to parallel signals, a display unit 55 for displaying predetermined information, and an operation unit 56.

The CPU 50 is one example for achieving the objects of the present invention, and is adapted to poll P times when receiving an error signal from the terminal unit or when the terminal unit does not respond, to transfer to the polling of another terminal unit after receiving the error signal or if the terminal unit does not respond, to subsequently poll the terminal unit which has not responded or from which the error signal was received q times (where $p>q$) and to then transfer to the polling of another terminal unit.

In FIG. 1, repeaters C1, . . , Cn, fire sensors S1, . . , Sn are exemplified as the terminal units, and the number of the repeaters and the fire sensors may be determined as required.

The receiver R also comprises a ROM 11 for storing a system management program, a ROM 12 for storing an address/type map, a ROM 13 for storing a sensor data analysis program, a ROM 14 for storing a sensor data analysis program, a ROM 15 for storing a control program, and a ROM 16 for storing a test program.

The receiver R further comprises a RAM 11 for storing a polling address, a RAM 12 for storing a command code for a terminal unit, a RAM 13 for storing a primary addition code SM1 (which code is the addition of the polling address and the command code), a RAM 14 for storing a data code received from the terminal unit, a RAM 15 for storing a secondary addition code SM2 (which code is the addition of the address code, the command code, the primary addition code SM1, and the data code), a RAM 16 for storing the address of the no response terminal unit, a RAM 17 for storing the address of the error signal transmission terminal unit, a RAM 18 for storing the sensor data, and a RAM 19 used as a working area.

The receiver R also has an error signal display lamp for displaying hen a terminal unit such as the repeater C1 or the like transmits an error signal, its control circuit 57*a*, a no response display lamp 58 for displaying when the terminal unit does not respond to the polling, and its control circuit 58*a*.

Figure 2:
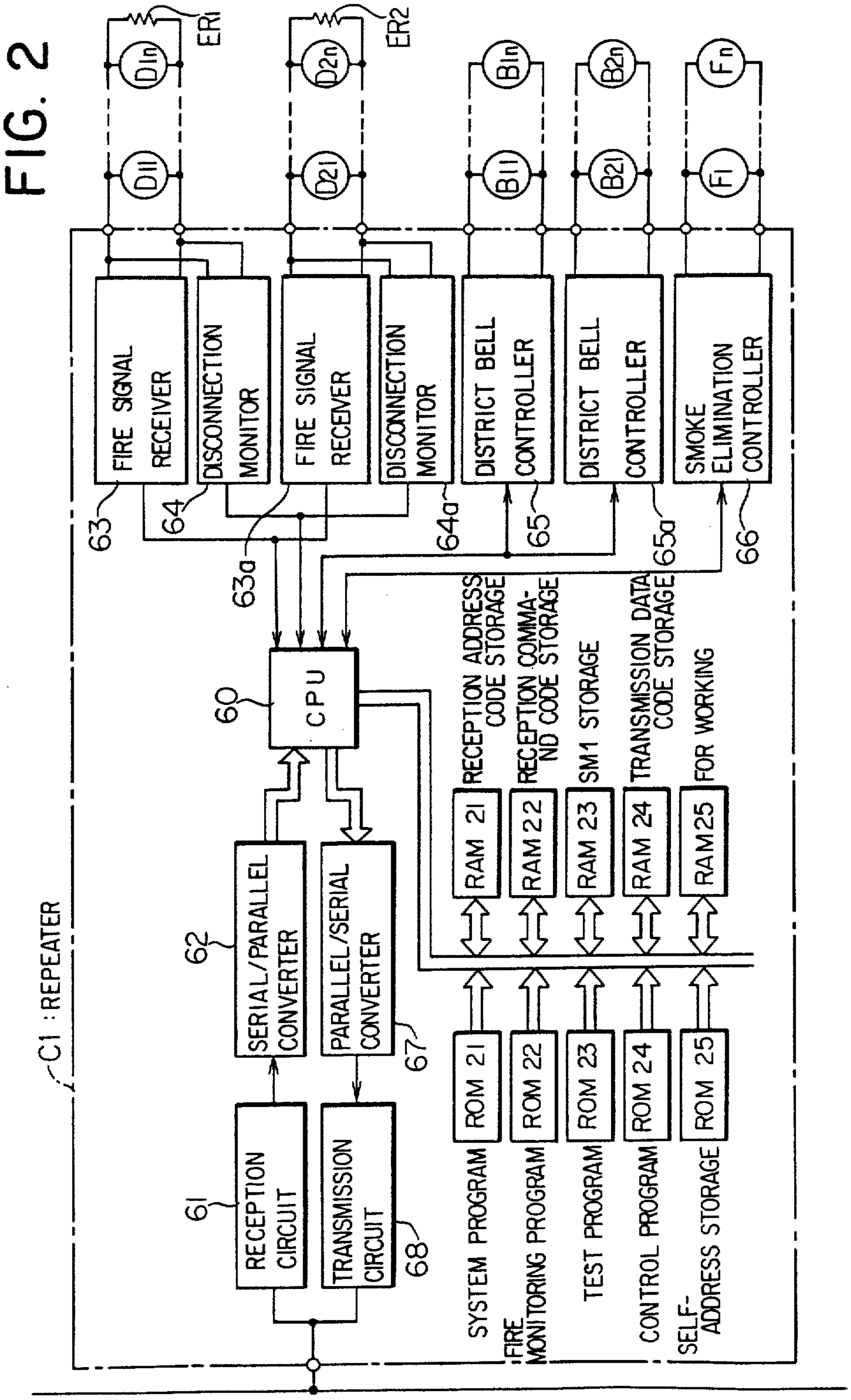
FIG. 2 is a block diagram showing an example of a repeater in the above-described embodiment.

FIG. 2 is a block diagram showing an example of a repeater C1 in the above-described embodiment.

The block diagram in FIG. 2 is exemplified with the repeater C1 as an example, and other, repeaters such as repeaters C2, . . , Cn are similar to that shown in FIG. 2.

The repeater C1 comprises a CPU 60 for controlling the entirety of the repeater C1, a reception circuit 61 for receiving a reception signal, a serial/parallel conversion circuit 62 for converting the reception signal (serial signal) into parallel signals, a fire signal reception circuit 63 for receiving fire signals from fire sensors D11 to D1n, a fire signal reception circuit 63*a* for receiving a fire signal from fire sensors D21 to D2*n*, a disconnection monitoring circuit 64 for monitoring the disconnection of a signal line to the fire sensors D11 to D1n, a disconnection monitoring circuit 64*a* for monitoring the disconnection of a signal line to the fire sensors D21 to D2n, an area bell control circuit 65 for controlling area bells B11 to B1n, an area bell control circuit 65*a* for controlling area bells B21 to B2n, a smoke elimination control circuit 66 for controlling smoke eliminators F1 to Fn, a parallel/serial conversion circuit 67 for converting parallel signals from the CPU 60 to serial signals, and a transmission circuit 68 for transmitting to the receiver R. Symbols ER1 and ER2 denote terminators.

The repeater Cl also comprises a ROM 21 for storing a system program, a ROM 22 for storing a fire monitoring program, a ROM 23 for storing a test program, a ROM 24 for storing a control program, a ROM 25 for storing the address of the repeater Cl itself, a RAM 21 for storing a reception address code, a RAM 22 for storing a reception command code, a RAM 23 for storing a primary addition code SM1, a RAM 24 for storing a transmission data code, and a RAM 25 used as a working area.

Figure 3:
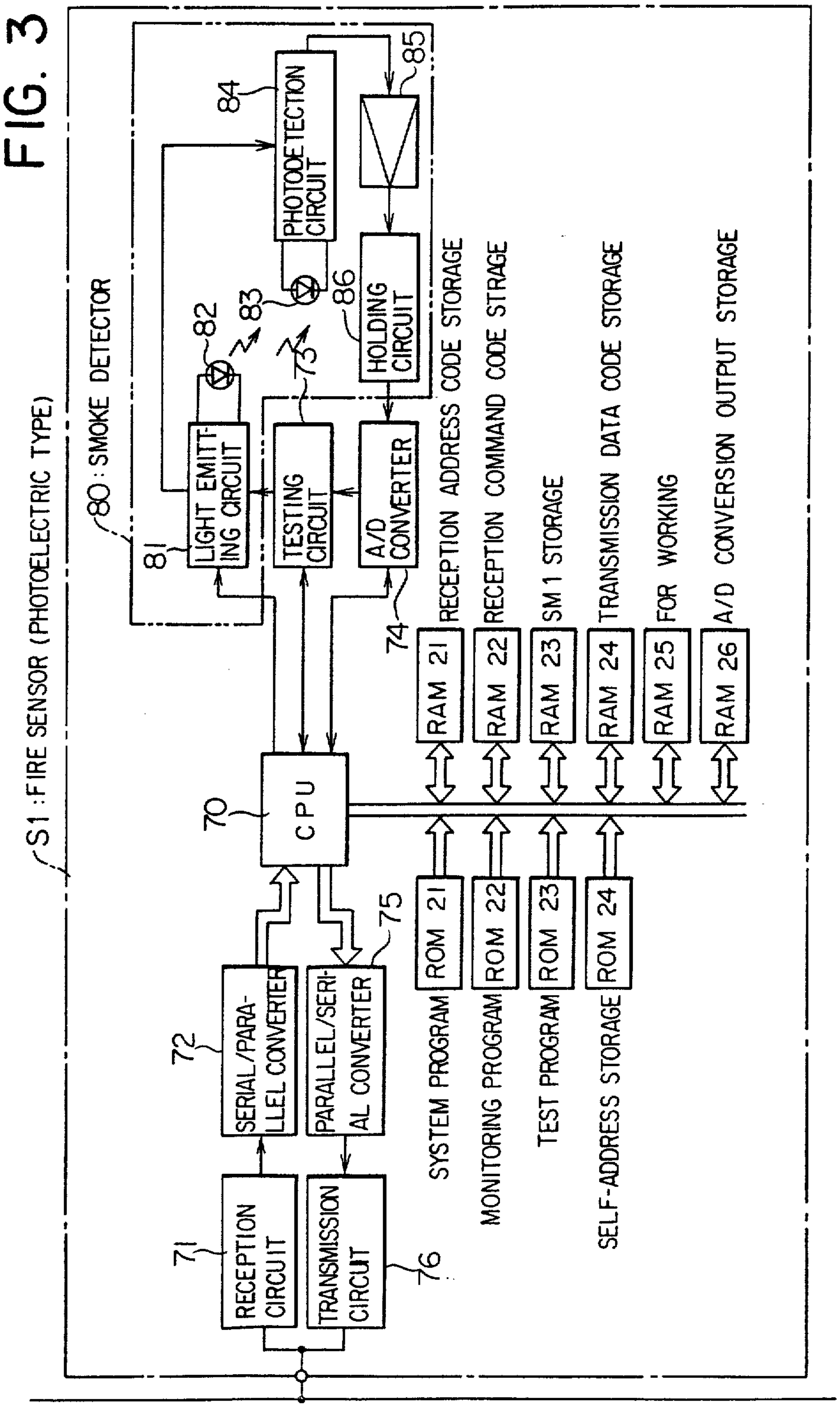
FIG. 3 is a block diagram showing an example of a fire sensor in the above-described embodiment.

FIG. 3 is a block diagram showing an example of a fire sensor S1 in the above-described embodiment.

Other fire sensors such as fire sensors S2, . . , Sn have constructions similar to the fire sensor S1 shown in FIG. 3.

The fire sensor S1 comprises a CPU 70 for controlling the entirety of the fire sensor S1, a reception signal 71 for receiving a reception signal, a serial/parallel conversion circuit 72 for converting serial signals from the reception circuit 71 into parallel signals, a smoke detector 80, a testing circuit 73 for testing the smoke detector 80, an A/D conversion circuit 74 for converting an analog signal responsive to the smoke detection amount from the smoke detector 80 into a digital signal, a parallel/serial conversion circuit 75 for converting the parallel signals from the CPU 70 into serial signals, and a transmission circuit 76 for transmitting the signal to the receiver R.

The fire sensor S1 also comprises a ROM 21 for storing a system program, a ROM 22 for storing a monitoring program, a ROM 23 for storing a test program, a ROM 24 for storing the address of the fire sensor S1 itself, a RAM 21 for storing a reception address code, a RAM 22 for storing a reception command code, a RAM 23 for storing a primary addition code SM1, a RAM 24 for storing a transmission data code, a RAM 25 used as a working area, and a RAM 26 for storing an A/D conversion output.

The smoke detector 80 has a light emitting element 82, a light emission circuit 81 for intermittently emitting the light emitting element 82, a photodetector 83, a photodetection circuit 84, an amplifier 85, and a holding circuit 86 for holding the received amplified output until the next emission of the light.

Next, the operation of the above-described embodiment will now be described.

FIGS. 4(1), 4(2) and 4(3) are flow charts showing the operation of the receiver R.

An initial value is first, set in step S10 of FIG. 4(1), and a polling address n is then increased by an increment of one in step S11. If the polled terminal unit does not respond, the counted numbers m, m' of the primary and secondary no response retry counters for counting the number of polling times are again reset, while if the polled terminal unit produces an error signal, the counter numbers h, h ' of the primary and secondary error signal retry counters for counting the number of polling times are reset in step S12.

Then the n-th address code is stored in RAM 11 in step S13 of FIG. 4(1), the command code is stored in RAM 12 in step S14, the polling address (which is the content of RAM 11) and the command code (which is the content of RAM 12) are added and the primary addition code SM1 of the added result of the polling address and the command code is stored in RAM 13 in step S15.

Then, the start code and the codes of RAM 11 to RAM 13 are sequentially transmitted in step S16, and in step S17 it is judged whether or not there is a reception signal. When there is no reception signal, it is judged in step S18 whether or not a predetermined time has elapsed. When the predetermined time has elapsed, it is judged in step S20 whether or not an address n is in RAM 16. In other words, it is determined whether or not the n-th terminal unit which has not replied also failed to reply in the previous polling period and whether or not the address thereof is stored.

When there is no address n in RAM 16 (since this means that the n-th terminal unit has not replied in the previous polling period) in step S20, the count m of the primary no response retry counter is increased by an increment by one in step S21. Then, it is judged in step S22 whether or not the count m is the same as the upper limit value M (which is the number corresponding to p times in the previous step, e.g., 5). When the count m is the same as the upper limit value M, the address n is stored in RAM 16 in step S23, the flow is returned to step S11, and the next terminal unit is then polled. When the retry count m does not yet reach the set value M, the flow is returned to step S16, and the n-th terminal unit is again polled.

Since the n-th terminal unit has, on the other hand, not responded during the previous polling period when the address n is stored in RAM 16, the count m' of the secondary no response retry counter is increased by an increment of one in step S24. Then, it is judged in step S25 whether or not the count m' is the same as the upper limit value M' (which is the number corresponding to the q times of the previous step, e.g., 2) of the secondary retry counter. If the count m' is the same as the set value M', the flow is returned to step S11, the next terminal unit is polled, while if the count m' is different from the set value M', the flow is returned to step S16 to again poll the n-th terminal unit.

If the reception signal is received in step S17, the received data code is then stored in RAM 14 in step S30, the received secondary addition code SM2 is stored in RAM 15 in step S31, and it is judged in step S32 whether or not the address n is in RAM 16 or not. In other words, it is judged whether or not the n-th terminal unit has not responded in the previous polling period, the address n is erased in RAM 16 in step S33 since the n-th terminal unit has replied as long as the address n is in RAM 16, and the codes stored in RAM 11 to RAM 14 are added in step S34 of FIG. 4(2). Then, it is judged in step S35 whether or not the added result coincides with the secondary addition code SM2 stored in RAM 15, i.e., whether or not the signal code has been correctly received. When the added result coincides with the secondary address code SM2, it is judged in step S36 whether or not the command content stored in RAM 12 coincides with the mode signal of the data code stored in RAM 14, i.e., whether or not the terminal unit returns the signal responsive to the command content. When the received data code coincides with the command content, the mode signal is read from the data code in step S50.

FIG. 7 is a view showing an example of reception data code returned from the terminal unit.

In FIG. 7, the data code is composed, for example, of 8 bits, and has a mode signal and a data signal. The mode signal is composed, for example, of 2 bits, and the data signal is composed, for example, of 6 bits. In this example, the mode signals "00", "01", "10" or "11", correspond to data for the detector mode, control result mode, test result mode and sensor mode respectively.

When the terminal unit is a fire sensor S1, the mode signal indicates the data signal detected by the fire sensor S1 or the data signal of the test result.

Then, it is judged whether the read mode signal is a sensor mode (in step S51), a detector mode (in step S52), a control result mode (in step S53 of FIG. 4(3)), or a test result mode (in step S54), and the corresponding process is executed.

More specifically, when the read mode signal is in the sensor mode in step S51, the data signal of the data code is stored in a predetermined area of RAM 18 in step S60 to analyze the sensor data in step S61. When the read mode signal is in the detector mode in step S52, a fire area is judged on the basis of the data signal of the data code in step S62. When the read mode signal is the control result mode in step S53, the control result is judged on the basis of the data signal of the data code in step S63 of FIG. 4(3). When the test result is obtained in step S54, the test result is judged on the basis of the data signal of the data code in step S55.

When the mode signal does not correspond to any of the mode signals described above, it means that the n-th terminal unit receives an error signal. Thus, it is judged in step S40 of FIG. 4(2) whether or not there is an address n in RAM 17 for storing the number of the terminal unit which has produced the error signal When there is no address n in RAM 17, the counted value h of the primary error signal retry counter is increased by an increment of one in step S41, and it is judged in step S42 whether or not the counted value h is the same as the set value H (which is the number corresponding to p times of the previous step, e.g., 5) or not. When the counted value h is the same as the set value H, the address n is stored as the address of the terminal unit which has produced the error signal in RAM 17 in step S43, the flow is then returned to step S11, and the next terminal unit is polled. When the error signal retry counted value h does not reach the set value H, the flow is returned to step S16, and the polling of the n-th terminal unit is retried. When there is the address n in RAM 17, the counted value h' of the secondary error signal retry counter is increased by an increment of one in step S44, and it is judged in step S45 whether or not the counted value h' is the same as the upper limit value H (which is the number corresponding to the q times of the previous step, e.g., 2). When the counted value h' is the same as the upper limit value H, the flow is returned to step S11, and when the counted value h' does not reach the upper limit value H', the flow is returned to step S16. When the added result does not coincide with the code of RAM 15 in step S35 or when the command content does not coincide with the mode signal in step S36, it means that the n-th terminal unit has received the error signal. In this case, the flow is processed in step 40 and the following steps.

When the sensor mode, the detector mode, the control result mode and the test result mode are finished, it is judged in step S70 of FIG. 4(3) whether or not the other mode signal is retained in RAM 14. When there is another mode signal in RAM 14, the step S50 of reading the mode signal from the data code is repeated. When there is no other mode signal in RAM 14, it is judged in step S71 whether or not the address n is in RAM 17. When the address n is in RAM 17, the address of the terminal unit which has normally produced the signal is stored as the terminal unit which has produced the error signal in RAM 17. Thus, the address n is cleared in RAM 17 in step S72.

Then, it is judged in step S73 whether or not the polling address n has become the final polling address N. When the address n becomes the final polling address N, the polling address n is reset to 0 in step S74. Thereafter, the process is repeated from step S11.

Next, the operation of the repeater C will be described.

Figure 5:
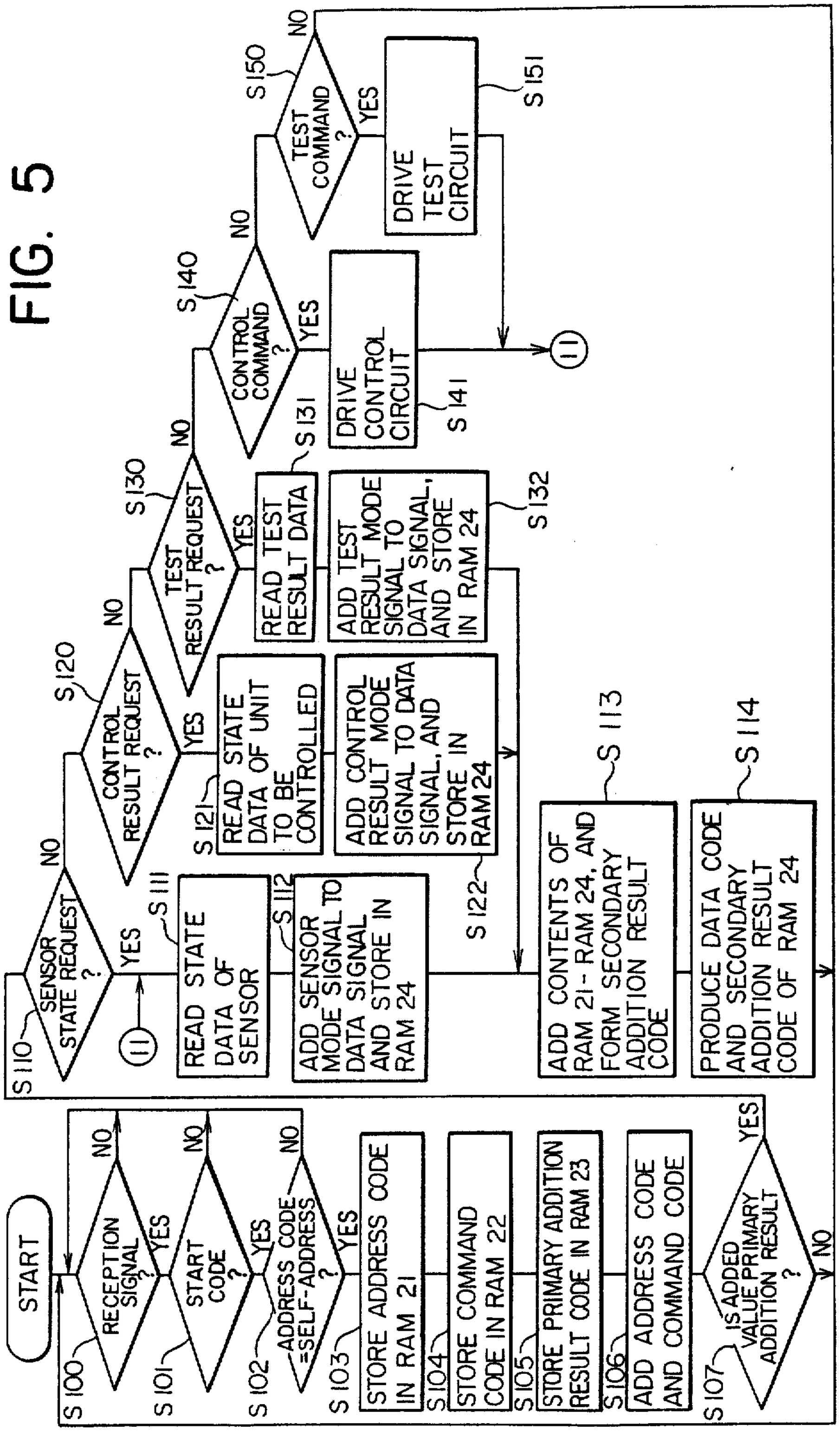
FIG. 5 is a flow chart showing the operation of the repeater in the above-described embodiment.

FIG. 5 is a flow chart showing the operation of the repeater C.

Whether or not there is a reception signal is judged in step S100, there is a start code in step S101 and when an address code coincides with a self-address code in step S102, the address code is stored in RAM 21 in step S103, a command code is stored in RAM 22 in step S104, the primary addition code SM1 is stored in RAM 23 in step S105, and the address code and the command code are added in step S106.

Whether the addition value of the address code and the command code coincides with the primary addition code SM1 i.e., whether or not the signal code, is correctly received, is judged in step S107, and if the addition value of the address code and the command code does not coincide with the primary addition code SM1, the flow is returned to the step S100, while if the addition value of the address code and the command code coincides with the primary addition code SM1, it is judged whether the received command code of RAM 12 is a sensor state request command, a control result request command, a rest result request command, a control command or a test command.

When the received command code is the sensor state request command in step S110, the state data of the sensor, i.e., the presence or absence of the fire signal is read from the fire signal reception circuits 63, 63*a* in step S111, the sensor mode signal is added to the data signal to be stored in RAM 24 in step S112, the contents stored in RAM 21 to RAM 24 are added to thereby form the secondary addition code SM2 in step S113, the data code of RAM 24 and the secondary addition code SM2 are produced in step S114, and the flow is returned to step S100.

When the received command code is the control result request command in step S120, the state data of the terminal unit to be controlled is read from the district bell control circuits 65, 65*a* and the smoke elimination control circuit 66 in step S121, the control result mode is added to the data signal to be stored in RAM 24 in step S122, and the flow is then advanced to step S113. When the received command code is the test result request command in step S130, the data of the test result is read from the disconnection monitoring circuits 64, 64*a* in step S131, the test result mode signal is added to the data signal to be stored in RAM 24 in step S132, and the flow is advanced to step S113. When the received command code is the control command in step S140, the corresponding one of the control circuits 65, 65*a*, 66 is driven in step S141, and the flow is advanced to step S111. When the received command code is the test command in step S150, the disconnection monitoring circuits 64, 64*a* as the testing circuits are driven in step S151, and the flow is returned to step S111.

Next, the operation of the fire sensor will be described.

Figure 6:
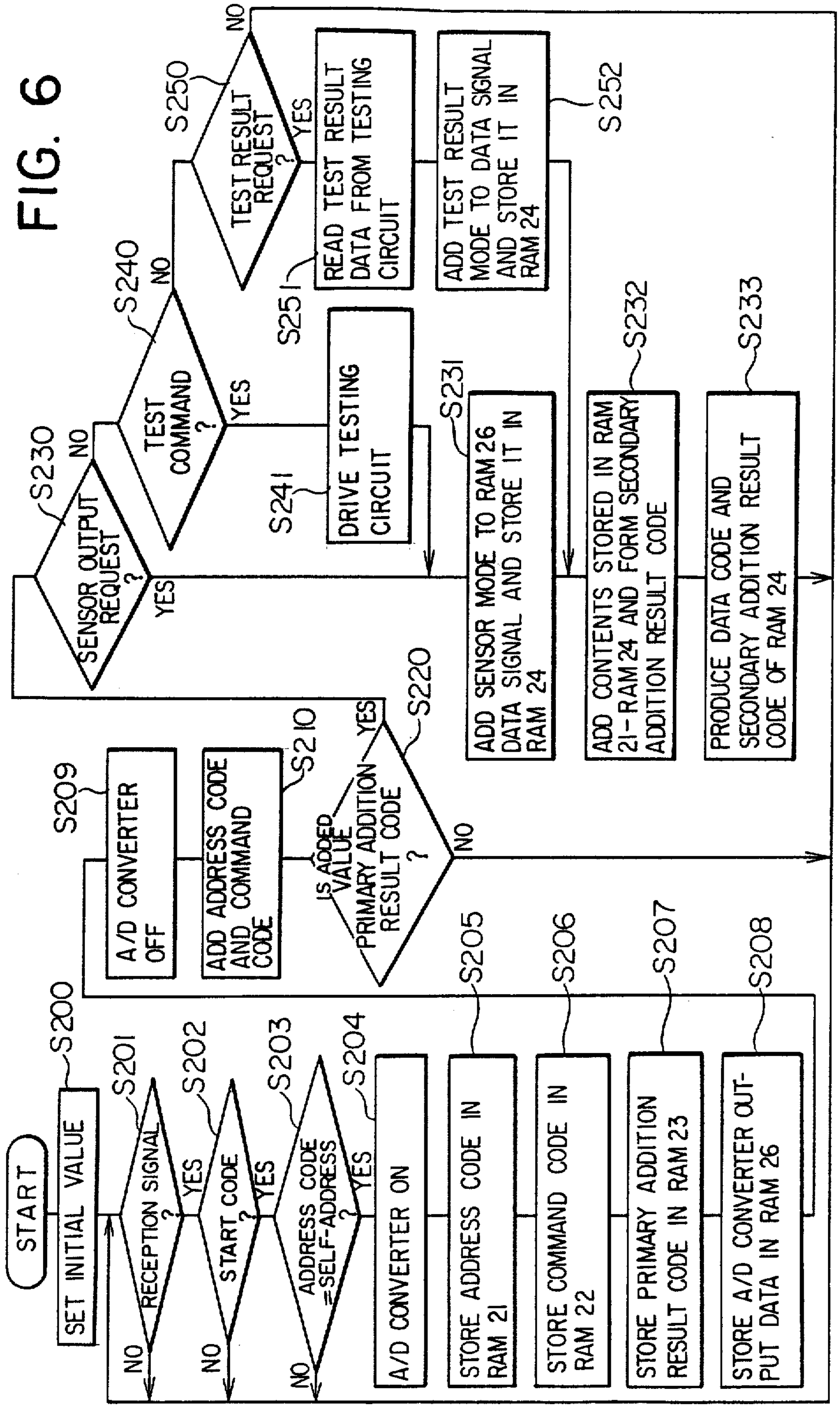
FIG. 6 is a flow chart showing the operation of the fire sensor in the above-described embodiment.

FIG. 6 is a flow chart showing the operation of the fire sensor S1.

An initial value is first set in step S200, there is a reception signal in step S201, there is a start code in step S202, and when the address code coincides with a self-address code in step S203, the A/D converter 74 is turned ON in step S204, the address code is stored in RAM 21 in step S205, the command code is stored in RAM 22 in step S206, and the primary addition result code is stored in RAM 23 in step S207. Then, the output data of the A/D converter 74 is stored in RAM 26 in step S208, the A/D converter 74 is turned OFF in step S209, and the address code and the command code are added in step S210.

When the addition value coincides with the primary addition result code, it is judged whether the received command code of RAM 22 is a sensor output request command, a test command or a test result request command.

When the sensor output is requested in step S230, the sensor mode signal is added to the data signal of RAM 26 to be stored in RAM 24 in step S231, the contents stored in RAM 21 to RAM 24 are added to form the secondary addition result code in step S232, and the data code and the secondary addition result code of RAM 24 are produced in step S233.

When the received command code is the test command in step S240, the testing circuit 73 is driven in step S241, and the flow is advanced to step S231. When the test result is requested in step S250, the test result data from the testing circuit 73 is read out in step S251, the test result mode is added to the data signal to be stored in RAM 24 in step S252, and the flow is then advanced to step S232.

In the embodiment described above, when there is a terminal unit which has not responded or produced an error signal, it is first (in first cycle) continuously called five times, and if as a result the terminal unit does not respond or produces an error signal, the address of the terminal unit is stored. Then, the terminal unit is called a number of times less than the initial time (e.g., continuously called twice) at the next (second cycle) and following times of polling, and the next terminal unit is then polled.

Thus, the polling does not stagnate in the terminal unit which has not responded or produced an error signal, thereby rapidly achieving the acquisition of monitoring information from the terminal unit and the acquisition of control information to the terminal unit.

In the embodiment described above, the primary addition code SM1 or the secondary addition code SM2 is used to perform a sum check. However, instead of the sum check, a cyclic redundancy check may be carried out. The sum check and the cyclic redundancy check are generally called "a frame check". Of course, other frame checks may also be executed.

The frame check may be, when transmitting from the receiver R to the terminal unit, conducted for the address code and the control data, and, when transmitting from the terminal unit to the receiver R, conducted for the address code, the control data transmitted from the receiver R and the data to be transmitted to the receiver R.

The terminal units may include, in addition to a repeater, a fire sensor, and a fire detector, a smoke eliminator, a fire extinguisher and an antitheft unit.

In the embodiment described above, the data code has 8 bits, the mode signal has 2 bits, and the data signal has 6 bits. However, the bit number of the data code, the mode signal and the data signal may be set arbitrarily. The sequence of the mode signal and the data signal may also be reversely set.

In the embodiment described above, the number of retries (P times) in the first cycle may be any, and the number of retries (q times) in the second cycle may also be any number, but it is necessary that the number of retries in the second cycle be smaller than the number of retries in the first cycle. In other words, it is necessary that $p>q$.

According to the present invention, the receiver transmits the primary signal frame made of the primary frame check signal formed, for example, of the address signal, the command signal and the added value of the address signal and the command signal to the terminal unit, stores in the memory means at least transmitted address signal and the command signal, the polled terminal unit adds at least the address signal and the command signal of the received primary signal frame, compares the result with the received primary frame check signal to judge whether or not there is a transmission error or not, the terminal unit, for example, adds the return signal such as data code, at least the received address signal and the command signal to form the secondary frame check signal, produces the secondary frame check signal and the return signal as the secondary signal frame, and the receiver which receives the secondary signal frame adds the stored at least address signal, the command signal and the received return signal to collate the received secondary frame check signal to judge whether it receives the signal without transmission error from in the terminal unit or not. Therefore, there is an advantage that the transmission error of the signal between the receiver and the terminal unit can be firmly checked.

Further, the secondary frame check signal formed and transmitted by the terminal unit contains the address signal and the command signal received from the receiver, and the receiver can judge whether or not it is the signal from the polled terminal unit without receiving the synchronous byte signal (header byte) and the self-address signal from the terminal unit by the secondary frame check signal. Therefore, there is an advantage that the frame length of the signal can be shortened.

Moreover, since the mode signal indicating the type of the data signal can be added when the data signal is transmitted to the receiver by the terminal unit, the type of the data returned from the terminal unit to the receiver can be accurately judged by the receiver. Further, since wasteful judgement is not conducted when unnecessary data is received, there is an advantage that the terminal information can be efficiently acquired.

Furthermore, since the second and the following polling number can be reduced when the receiver receives an error signal from the terminal unit or the terminal unit does not respond, the acquisition of monitoring information and the transmitting velocity of control information is not delayed when a terminal unit is continuously abnormal.

What is claimed is:

1. A disaster prevention monitoring and control facility comprising:
- a plurality of terminal units;
- a central unit for connection to said plurality of terminal units, and having means for transmitting and receiving data information signals to and from each of said plurality of terminal units;
- sum checking means, disposed in each of said terminal units and central means, for summing selected portions of each of said data information signals transmitted and received by said central unit and by each of said terminal units, and for determining whether each of said data information signals contains an error on the basis of the thus summed selected portions of each of said data information signals;
- a polling means, disposed in said central unit, for polling each of said terminal units, said polling means conducting P polling attempts during a first polling cycle, P being an integer greater than 1, wherein said central unit initiates a transfer to another process when a terminal unit fails to properly respond to said P polling attempts, said polling means further conducting Q polling attempts during a second polling cycle after said transfer to another process, Q being a positive integer less than P;
- wherein, during said first and second polling cycles, each subsequent polling attempt is conducted when said sum checking means indicates that said data information signal received in response to a previous polling attempt from one of said terminal units contains an error and when an absence of a data information signal is detected in response to a previous polling attempt from one of said terminal units.

2. A disaster prevention monitoring and control facility as claimed in claim 1, wherein said sum checking means includes means for adding an address code and a command code.

3. A disaster prevention monitoring and control facility as claimed in claim 2, wherein said sum checking means includes means for adding a mode signal indicating a type of data transmitted from said terminal units to said central unit.

4. A disaster prevent monitoring and control facility as claimed in claim 1, wherein said sum checking means includes means for adding a mode signal indicating a type of data transmitted from said terminal units to said central unit.

5. A disaster prevention monitoring and control facility as claimed in claim 1, wherein at least one of said terminal units is a repeater.

6. A disaster prevention monitoring and control facility as claimed in claim 1, wherein at least one of said terminal units is a fire sensor.

7. A disaster prevention monitoring and control facility as claimed in claim 1, wherein at least one of said terminal units is a fire detector.

8. A disaster prevention monitoring and control facility as claimed in claim 1, wherein at least one of said terminal units is a smoke eliminator.

9. A disaster prevention monitoring and control facility as claimed in claim 1, wherein at least one of said terminal units is a fire extinguisher.

10. A disaster prevention monitoring and control facility as claimed in claim 1, wherein at least one of said terminal units is an antitheft unit.

11. A disaster prevention monitoring and control facility comprising:

a central unit having means for connection to a plurality of terminal units, and having means for transmitting and receiving data information signals to and from each of said plurality of terminal units;

a polling means, disposed in said central unit, for polling each of said terminal units, said polling means conducting P polling attempts during a first polling cycle, P being an integer greater than 1, wherein said central unit initiates a transfer to another process when a terminal unit fails to properly respond to said P polling attempts, said polling means further conducting Q polling attempts during a second polling cycle after said transfer to another process, Q being a positive integer less than P.

* * * * *